United States Patent
Dejardin et al.

(10) Patent No.: US 11,057,133 B2
(45) Date of Patent: Jul. 6, 2021

(54) DEVICE FOR RECEIVING SIGNALS CAPTURED BY A SATELLITE ANTENNA

(71) Applicant: SAGEMCOM BROADBAND SAS, Rueil Malmaison (FR)

(72) Inventors: Romain Dejardin, Rueil Malmaison (FR); Eric Levecque, Rueil Malmaison (FR)

(73) Assignee: Sagemcom Broadband SAS, Rueil Malmaison (FR)

( * ) Notice: Subject to any disclaimer, the term of this patent is extended or adjusted under 35 U.S.C. 154(b) by 13 days.

(21) Appl. No.: 16/645,745

(22) PCT Filed: Aug. 16, 2018

(86) PCT No.: PCT/EP2018/072195
§ 371 (c)(1),
(2) Date: Mar. 9, 2020

(87) PCT Pub. No.: WO2019/063191
PCT Pub. Date: Apr. 4, 2019

(65) Prior Publication Data
US 2020/0287642 A1    Sep. 10, 2020

(30) Foreign Application Priority Data
Sep. 28, 2017  (FR) ..................... 1759037

(51) Int. Cl.
*H04B 1/16* (2006.01)
*H04H 40/90* (2008.01)

(52) U.S. Cl.
CPC .............. *H04H 40/90* (2013.01); *H04B 1/16* (2013.01)

(58) Field of Classification Search
CPC . H04B 1/16; H04B 1/18; H04H 20/63; H04H 40/90; H04H 7/20; H01Q 1/50; H01Q 1/52
See application file for complete search history.

(56) References Cited

U.S. PATENT DOCUMENTS

2009/0167465 A1    7/2009  Martch et al.
2010/0071023 A1*   3/2010  de Leeuw .............. H04H 40/90
                                                        725/151

(Continued)

FOREIGN PATENT DOCUMENTS

WO    WO2017149526 A2    9/2017

*Primary Examiner* — Sam Bhattacharya
(74) *Attorney, Agent, or Firm* — Muncy, Geissler, Olds & Lowe, P.C.

(57) ABSTRACT

A device for receiving signals captured by a satellite antenna, comprising a front circuit and a digital circuit, the front circuit and the digital circuit being galvanically isolated relative to each other by isolation means, the front circuit comprising a first electric mass, an input port, a universal head power supply component, and an output module of a switched-mode power supply of the universal head power supply component, the digital circuit comprising a second electric ground, an output port, reception components arranged to acquire the input signals, so as to convert them to output signals and to apply the output signals on the output port, an input module of the switched-mode power supply, and a control component arranged to generate control signals intended for the universal head power supply component.

8 Claims, 2 Drawing Sheets

(56) References Cited

U.S. PATENT DOCUMENTS

2011/0292294 A1* 12/2011 Franke ............... H04N 21/4263
                                                        348/720
2017/0244326 A1*  8/2017 Petrovic ............ H02M 3/33507

* cited by examiner

DEVICE FOR RECEIVING SIGNALS CAPTURED BY A SATELLITE ANTENNA

The invention relates to the field of receiver devices for receiving signals picked up by a satellite antenna.

BACKGROUND OF THE INVENTION

With reference to FIG. 1, a satellite television installation comprises, from upstream to downstream: a satellite antenna 1, a distribution network 2, a decoder box 3, and a TV set 4.

A universal head, also referred to as a Low Noise Block (LNB) converter, is mounted on the satellite antenna 1. The universal head is powered and controlled by the decoder box 3. The universal head shapes the signals picked up by the satellite antenna 1 and transposes them into a predefined reception band, typically lying in the range 950 megahertz (MHz) to 2350 MHz.

The distribution network 2 conventionally comprises a coaxial cable connecting the universal head to the decoder box 3. The decoder box 3 and the TV set 4 are connected together by a digital transmission cable, e.g. an HDMI cable, a USB cable, an Ethernet cable, etc.

The distribution network 2 may be an individual distribution network, as shown in FIG. 1, but it could equally well be a communal distribution network. By way of example, a communal distribution network may have a universal head with a plurality of outputs connected to a plurality of decoder boxes.

In general, the distribution network 2 and the satellite antenna 1 are connected to earth 5 and to the mains electricity network 6, as is the TV set 4. The earth 5 to which the distribution network 2 and the satellite antenna 1 are connected, and the earth 5 to which the television set 4 is connected, may sometimes present potential differences that are large.

As a general rule, the decoder box 3 is not connected to ground.

Thus, when the decoder box 3 is connected to the distribution network 2, since the decoder box 3 is connected to the TV set 4, the electrical grounds of the TV set 4, of the decoder box 3, and of the equipment in the distribution network 2 are taken to the same potential by the digital transmission cable. This produces ground loops 7. The above-mentioned large potential differences give rise to large currents, which may destroy certain components in the decoder box 3 or which may heat the connectors of the cables included in the ground loops 7 (and in particular the connectors of the digital transmission cable).

Also, in certain countries, the mains network is sometimes arranged in such a manner that a break in the neutral of a line of the electricity network can generate large currents in the electrical grounds. These large currents can likewise destroy certain components of the decoder box 3, heat the connectors of the cables, and possibly also lead to externally-visible degradation of the decoder box 3, as a result of heating.

OBJECT OF THE INVENTION

An object of the invention is to improve the protection of a receiver device for receiving signals picked up by a satellite antenna against the above-described phenomena.

SUMMARY OF THE INVENTION

In order to achieve this object, there is provided a receiver device for receiving signals picked up by a satellite antenna, the device comprising both a front-end circuit for connecting to a universal head mounted on the satellite antenna and also a digital circuit for connecting to destination equipment, the front-end circuit and the digital circuit being electrically isolated from each other by isolation means, the front-end circuit having a first electrical ground, an input port arranged to receive input signals coming from the universal head, a universal head power supply component, and an output module of a switch mode power supply for the universal head power supply component, the digital circuit having a second electrical ground, an output port, reception components arranged to acquire the input signals, to transform them into output signals, and to apply the output signals to the output port, an input module of the switch mode power supply, and a control component arranged to produce control signals for the universal head power supply component.

The front-end circuit and the digital circuit are thus electrically isolated from each other, and the first electrical ground and the second electrical ground are distinct and independent of each other.

This serves to block the above-described ground loop phenomenon. Furthermore, both the digital circuit and also the cables and equipment situated downstream from the receiver device are protected from current peaks or voltage surges coming from the satellite antenna, from the universal head, from the distribution network, or from the mains network.

A decoder box is also provided including a receiver device similar to that described above.

Other characteristics and advantages of the invention appear on reading the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
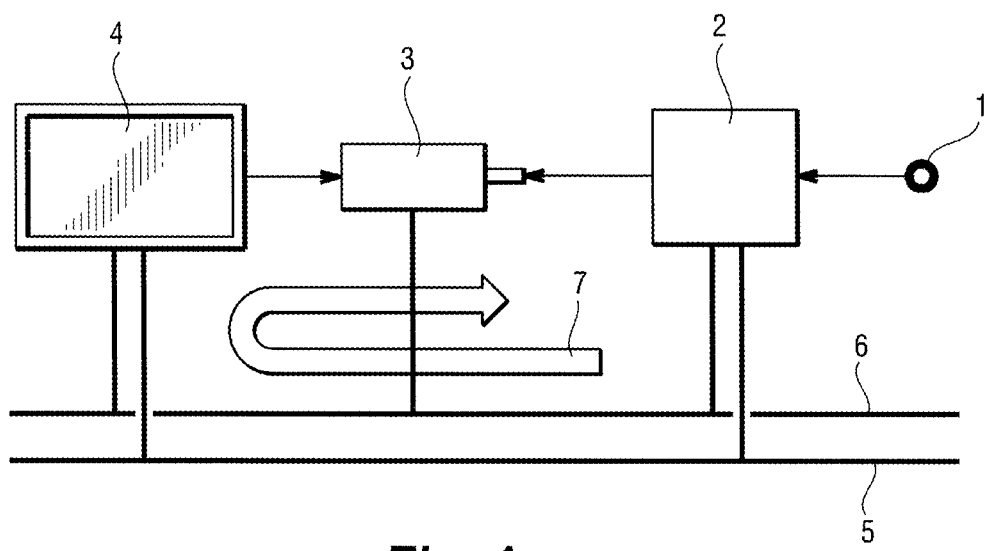
FIG. 1 shows a prior art satellite television installation.
Figure 2:
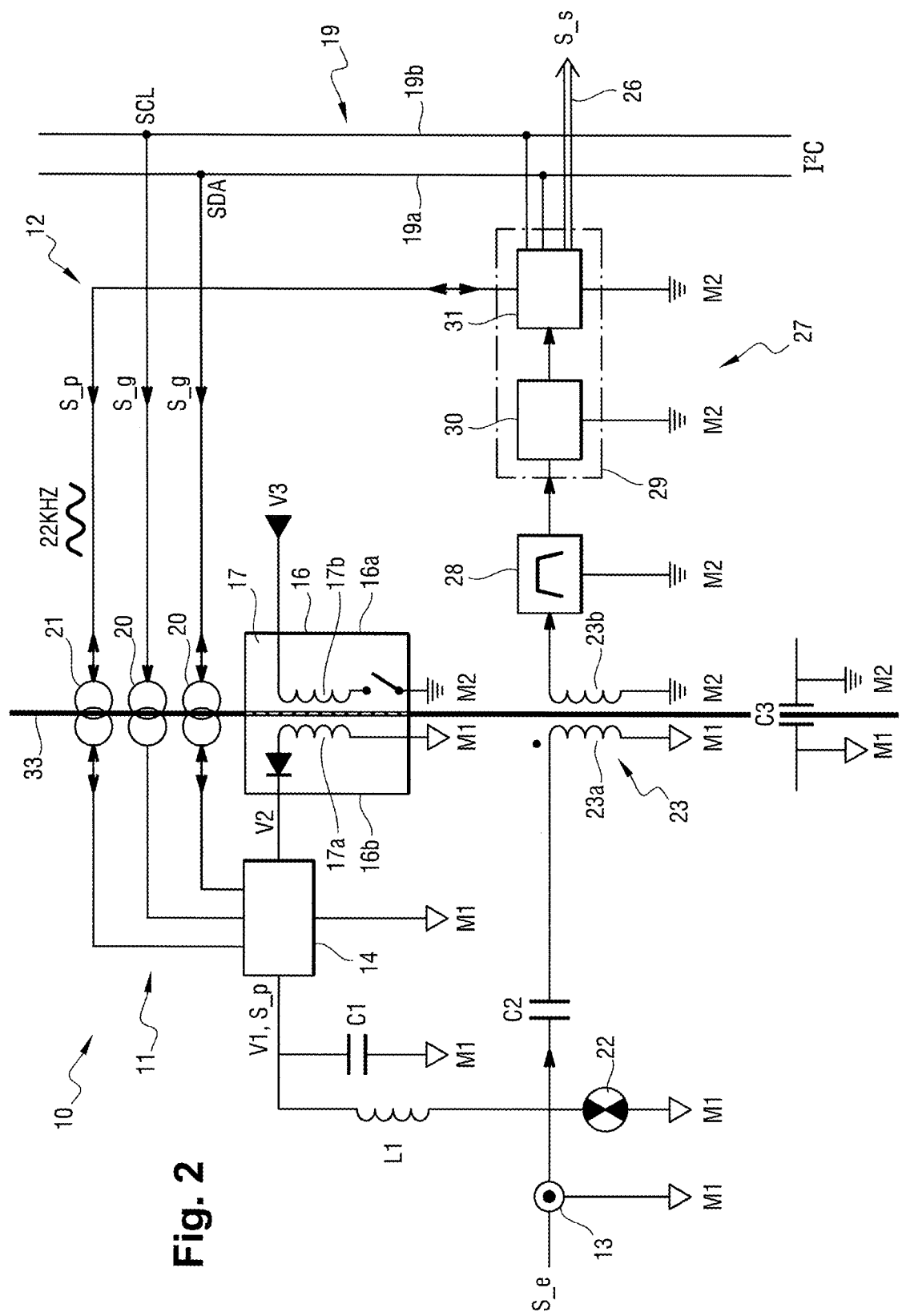
FIG. 2 shows a receiver device of the invention.

With reference to FIG. 2, the receiver device 10 of the invention in this example is integrated in a decoder box.

The decoder box is connected by a coaxial cable to a universal head, itself mounted on a satellite antenna. The satellite antenna picks up signals broadcast by satellite, which in this example contain TV programs.

The decoder box is a television decoder complying with satellite standard DVB-S, DVB-S2, or DVB-S2X.

In this example, the decoder box is connected to a TV set by an HDMI cable.

The decoder box receives input signals S_e coming from the universal head, and it transforms the input signals S_e into output signals S_s for the TV set.

In this example, the output signals S_s are digital TV signals transmitted using the TS-MPEG protocol.

The receiver device 10 comprises a front-end circuit 11 and a digital circuit 12, which are shown separated in FIG. 2 by a bold line 33.

The front-end circuit 11 is connected to the universal head. The digital circuit 12 is connected to the TV set.

The front-end circuit 11 and the digital circuit 12 are electrically isolated from each other: there is no conductive element connecting together the front-end circuit 11 and the digital circuit 12.

The front-end circuit 11 has a first electrical ground M1, which is used as a reference for all of the components of the front-end circuit 11. The digital circuit 12 has a second electrical ground M2, which is used as a reference for all of the components of the digital circuit 12.

The first electrical ground M1 comprises a first ground plane of the receiver device 10. The second electrical ground at M2 comprises a second ground plane of the receiver device 10.

The front-end circuit 11 also has an input port 13 connected to the universal head via a central conductor of the coaxial cable. Thus, the input port 13 is arranged to receive the input signals S_e coming from the universal head.

The front-end circuit 11 also has a power supply component for powering the universal head 14, which component delivers a power supply voltage V1 to the universal head via the central conductor of the coaxial cable. The power supply voltage V1 is a DC voltage of +13 volts (V) or of +18 V matching the configuration selected for the satellite antenna.

The power supply component for the universal head 14 also delivers command signals S_p to the universal head in order to control it. The command signals S_p are formed by means of a carrier at 22 kilohertz (kHz) modulated using On-Off Shift Keying (OOSK). The command signals S_p are superposed on the power supply voltage V1. The command signals S_p comprise both control messages for controlling the universal head, and also status messages. In particular, the control messages contain band selection messages for selecting the predefined reception band into which the signals picked up by the satellite antenna are to be transposed.

The universal head power supply component 14 is powered by a switch mode power supply 16, specifically a flyback converter. The switch mode power supply 16 delivers a DC voltage V2 of +12 V to the universal head power supply component 14.

The switch mode power supply 16 comprises an input module 16a and an output module 16b. The input module 16a of the switch mode power supply 16 is located in the digital circuit 12, while the output module 16b of the switch mode power supply 16 is located in the front-end circuit 11.

The input module 16a receives a DC voltage V3 of +12 V, and the output module 16b reduces the DC voltage V2 of +12 V. The switch mode power supply 16 thus delivers, at the DC voltage V2, the power required to enable the universal head power supply component 14 to operate.

The switch mode power supply 16 includes a first transformer 17. A first winding 17a of the first transformer 17 is located in the output module 16b of the switch mode power supply 16 (i.e. in the front-end circuit 11), while a second winding 17b of the first transformer 17 is located in the input module 16a of the switch mode power supply 16 (i.e. in the digital circuit 12).

A terminal of the first winding 17a of the first transformer 17 is connected to the first electrical ground M1. A terminal of the second winding 17b of the first transformer 17 is connected to the second electrical ground M2.

In the switch mode power supply 16, electrical isolation between the front-end circuit 11 and the digital circuit 12 is thus provided by the first transformer 17.

The universal head power supply component 14 receives control signals from the digital circuit 12, which signals control the operation of the universal head power supply component 14.

The control signals comprise both management signals S_g for managing the universal head power supply component 14 and also the above-mentioned command signals S_p.

The command signals S_p are for transmitting to the universal head by means of the universal head power supply component 14.

The management signals S_g are transmitted over an Inter-Integrated Circuit (I²C) bus 19 comprising a Serial DAta (SDA) line 19a and a Serial CLock (SCL) line 19b.

The management signals S_g are transmitted via two first optocouplers 20 of the receiver device 10.

The command signals S_p are transmitted via a second optocoupler 21 of the receiver device 10.

The first optocouplers 20 and the second optocoupler 21 serve to isolate the front-end circuit 11 electrically from the digital circuit 12. Digital communication is thus established between the front-end circuit 11 and the digital circuit 12 of the receiver device 10 via the first optocouplers 20 and the second optocoupler 21.

Each of the first and second optocouplers 20 and 21 presents an isolation voltage of 2500 V.

The universal head power supply component 14 applies a power supply voltage V1 and injects the command signals S_p into the input port 13 via an inductor L1 and a capacitor C1.

The inductor L1 is a choke coil, having inductance of 40 nanohenries (nH) and a saturation current of 4 amps (A). The capacitor C1 is a decoupling capacitor, having capacitance of 100 microfarads (ρF) and an operating voltage of 250 V.

It should be observed that the front-end circuit 11 includes a gas discharge tube (GDT) 22. The gas discharge tube 22 is connected between the input port 13 and the first electrical ground M1. The gas discharge tube 22 presents a discharge voltage of 90 V, and it is arranged to absorb current peaks up to 2.5 kiloamps (kA).

The receiver device 10 also has a transformer 23.

A first winding the 23a of the second transformer 23 is located in the front-end circuit 11. A second winding 23b of the second transformer 23 is located in the digital circuit 12.

A terminal of the first winding 23a of the second transformer 23 is connected to the first electrical ground M1. A terminal of the second winding 23b of the second transformer 23 is connected to the second electrical ground M2.

A capacitor C2 is connected in series between the input port 13 and the terminal of the first winding 23a of the second transformer 23 that is not connected to the first electrical ground M1.

The capacitor C2 is a link capacitor having an operating voltage that is adapted to the voltage presented on the input port 13, and having impedance that is selected to correspond to the passband of the signals picked up by the satellite antenna. The passband lies typically in the range 950 MHz to 2350 MHz. The capacitor C2 also rejects the DC component of the voltage present on the input port 13, together with the carrier at 22 kHz produced by the universal head power supply component 14.

The input signals of S_e are applied to the terminals of the first winding 23a of the second transformer 23.

The digital circuit 12 has an output port 26 and reception components 27 that acquire the input signals S_e and that transform them into output signals S_s.

The reception components 27 are connected to the second winding 23b of the second transformer 23.

For receiving and acquiring input signals S_e, electrical isolation between the front-end circuit 11 and the digital circuit 12 is thus provided by the second transformer 23.

The reception components 27 comprise a bandpass filter 28 and a receiver 29 comprising a tuner 30 and a demodulator 31.

The bandpass filter 28 is connected to the terminal of the second winding 23*b* of the second transformer 23 that is not connected to the second electrical ground of M2.

In this example, the bandpass filter 28 is a fifth order filter with 20 decibels (dB) rejection, and it serves to pass the signals picked up by the satellite antenna at a frequency lying in the range 950 MHz to 2350 MHz.

The tuner 30 is connected to the output of the bandpass filter 28. The demodulator 31 is connected to the output of the tuner 30.

The demodulator 31 acts in particular as a control component that produces the control signals, i.e. the management signals S_g and the command signals S_p.

The demodulator 31 transmits the management signals S_g over the I²C bus 19 to the universal head power supply component 14 via the first optocouplers 20.

The demodulator 31 transmits the command signals S_p via the second optocouplers 21 to the universal head power supply component 14.

The demodulator 31 applies the output signals S_s to the output port 26.

It should also be observed that the first and second electrical grounds M1 and M2 are connected together by a capacitor C3. The capacitor C3 withstands high voltages, but it presents impedance that is low and high frequency (typically in the range 30 MHz to 6 gigahertz (GHz)). The capacitor C3 serves to keep the first electrical ground M1 and the second electrical ground M2 at equal potential at high frequency, in order to satisfy electromagnetic compatibility constraints and requirements. In this example, the capacitor C3 presents capacitance of 180 picofarads (pF) and an operating voltage of 1000 V.

Naturally, the invention is not limited to the embodiment described, but covers any variant coming within the ambit of the invention as defined by the claims.

It is stated above that the receiver device is integrated in a decoder box that constitutes a TV decoder. Nevertheless, the receiver device could be connected to equipment used for a purpose other than TV, and the signals picked up by the satellite antenna could be other signals, e.g. telecommunication signals or satellite radio signals.

Although in the description above the command signals make use of a carrier at 22 kHz and are transmitted only from the decoder box to the universal head, this communication could be bidirectional. The universal head may also transmit data to the decoder box using a carrier at 22 kHz.

Naturally, the receiver device may include components that are not described herein, and may perform functions that are not mentioned. For example, the receiver device may include electronics for controlling equipment in compliance with the DisecQ1.x standard (for unidirectional communication) or with the DisecQ2.x standard (for bidirectional communication).

The invention claimed is:

1. A receiver device for receiving signals picked up by a satellite antenna, the receiver device comprising:
   a front-end circuit for connecting to a universal head mounted on the satellite antenna; and
   a digital circuit for connecting to destination equipment, the front-end circuit and the digital circuit being electrically isolated from each other by isolation means,
   the front-end circuit having:
      a first electrical ground,
      an input port arranged to receive input signals coming from the universal head,
      a universal head power supply component, and
      an output module of a switch mode power supply for the universal head power supply component,
   the digital circuit having:
      a second electrical ground,
      an output port,
      reception components arranged to acquire the input signals, to transform them into output signals, and to apply the output signals to the output port,
      an input module of the switch mode power supply, and
      a control component arranged to produce control signals for the universal head power supply component.

2. The receiver device according to claim 1, wherein the isolation means comprise a first winding and a second winding of a first transformer integrated in the switch mode power supply, the first winding of the first transformer being located in the output module of the switch mode power supply and the second winding of the first transformer being located in the input module of the switch mode power supply.

3. The receiver device according to claim 1, wherein the isolation means comprise a first winding and a second winding of a second transformer, the first winding of the second transformer being located in the front-end circuit, the second winding of the second transformer being located in the digital circuit, the input signals being applied to the terminals of the first winding of the second transformer, and the second winding of the second transformer being connected to the reception components.

4. The receiver device according to claim 1, wherein the isolation means comprise at least one optocoupler via which the control signals are transmitted.

5. The receiver device according to claim 4, wherein the control signals comprise management signals for managing the universal head power supply component, which management signals are transmitted via two first optocouplers, and command signals transmitted via a second optocoupler, the command signals being for transmission to the universal head by the universal head power supply component.

6. The receiver device according to claim 5, wherein the command signals are formed by an OOSK-modulated carrier at 22 kHz.

7. A decoder box including a receiver device according to claim 1.

8. The decoder box according to claim 7, the decoder box being a TV decoder.

* * * * *